United States Patent [19]

Kuper et al.

[11] Patent Number: 4,693,924

[45] Date of Patent: Sep. 15, 1987

[54] DECORATIVE TILE

[76] Inventors: Nina M. Kuper, 2520 N. Gordon Ct., Milwaukee, Wis. 53212; Janis I. Kalnajs, 724 E. Wells, Milwaukee, Wis. 53202

[21] Appl. No.: 896,672

[22] Filed: Aug. 14, 1986

Related U.S. Application Data

[63] Continuation-in-part of Ser. No. 701,073, Feb. 13, 1985.

[51] Int. Cl.[4] .................. B32B 3/20; B32B 13/02; C04B 31/06; C04B 31/26
[52] U.S. Cl. .................... 428/170; 106/110; 106/DIG. 2; 106/DIG. 3; 156/39; 156/42; 252/378 P; 264/DIG. 6; 428/171; 428/219; 428/310.5; 428/312.4; 428/312.6; 428/313.7; 428/317.9; 428/324; 428/331; 428/920; 428/703
[58] Field of Search .......... 106/110, DIG. 2, DIG. 3; 156/39, 42; 252/378 P; 264/DIG. 6; 428/219, 312.4, 312.6, 313.7, 317.9, 324, 331, 703, 920, 310.5, 524.2, 170, 171

[56] References Cited

U.S. PATENT DOCUMENTS

| | | | |
|---|---|---|---|
| 1,574,252 | 2/1926 | Marczinczek | 106/110 |
| 2,705,197 | 3/1955 | Seybold | 106/110 |
| 2,744,022 | 5/1956 | Croce et al. | 106/110 |
| 2,853,394 | 9/1958 | Riddell et al. | 106/114 |
| 2,945,820 | 7/1960 | Ziegler | 252/378 |
| 3,311,516 | 3/1967 | Jaunarajs et al. | 106/110 |
| 3,369,929 | 2/1968 | Petersen | 106/109 |
| 3,376,147 | 4/1968 | Dean | 106/114 |
| 3,862,881 | 1/1975 | Taniguchi et al. | 106/110 |
| 4,081,283 | 3/1978 | Lankard et al. | 106/110 |
| 4,087,285 | 5/1978 | Kurz | 106/110 |
| 4,148,660 | 4/1979 | Lankard et al. | 106/110 |
| 4,148,760 | 4/1979 | Sugier et al. | 252/455 |
| 4,265,979 | 5/1981 | Baehr et al. | 428/171 |
| 4,328,178 | 5/1982 | Kossatz | 106/110 |
| 4,403,006 | 9/1983 | Bruce et al. | 428/70 |
| 4,539,252 | 9/1984 | Franz | 428/310.5 |

FOREIGN PATENT DOCUMENTS 2746797 4/1979 Fed. Rep. of Germany .
3322375 1/1985 Fed. Rep. of Germany .

OTHER PUBLICATIONS

Chemical Abstracts, vol. 86, 1977–Abstract No. 86: 160087n.
Chemical Abstracts, vol. 87, 1977–Abstract No. 87: 121882u.
Chemical Abstracts, vol. 90, 1979–Abstract No. 90: 108937h.
Chemical Abstracts, vol. 90, 1979–Abstract No. 90: 75704z.

Primary Examiner—James C. Cannon
Attorney, Agent, or Firm—Foley & Lardner

[57] ABSTRACT

A decorative tile having a front face with a design thereon varies in density so that the front face of the tile presents a solid appearance, but the overall weight of the tile is less than for a comparable conventional plaster tile. The tile of the invention can be made from a mixture including a binder, fiber strands, and a bulk enhancing agent. The decorative tile of this invention is particularly useful for ceiling decoration.

18 Claims, 2 Drawing Figures

DECORATIVE TILE

This application is a continuation-in-part of U.S. Ser. No. 701,073, filed Feb. 13, 1985.

FIELD OF THE INVENTION

This invention relates to a decorative construction tile particularly suitable for building ornate ceilings.

BACKGROUND OF THE INVENTION

One type of traditional decorative tile comprises a square slab having one ornamented face. The ornamentation is usually in the form of relief sculpture, i.e. raised features. Such tiles have been applied directly to a ceiling or suspended from reinforced ceiling grid systems to make decorative ceilings.

Gypsum plaster-based decorative tiles of this type are heavy, bulky and frangible with minimal insulation value. Such tiles generally are made of gypsum plaster in combination with chopped glass or sisal fiber. While other materials may be used in minor amounts as diluents, the major components remain the plaster which provides compressive strength and structure and the glass or sisal fiber which is added for tensile and break strength. Such tiles can be molded to provide decorative three dimensional designs of intricate, sharply defined configurations. Due to the high weight and relative difficulty in manufacturing such tiles as compared to other building materials, molded tiles or slabs of plaster-based material have never gained widespread popularity in the construction of decorative ceilings.

Mineral wool-based ceiling tiles have been used in conjunction with a hanging grid system to provide a relatively inexpensive, lightweight ceiling tile which can be put in place quickly. Ceilings of this type are not aesthetically pleasing because the designs possible for these ceiling tiles are extremely limited, and the painted metal grid system is often discernible as a separate element. This invention provides a tile which is light in weight like such a mineral wool-based tile but has an ornate decorative face like a traditional gypsum-based tile.

Materials such as gypsum plaster, glass fibers, vermiculite and perlite have been previously used in various types of building materials such as wallboard. See, for example, Bruce U.S. Pat. No. 4,403,006 issued Sept. 6, 1983, Dean U.S. Pat. No. 3,376,147 issued Apr. 2, 1968, Ordell U.S. Pat. No. 2,853,394 issued Sept. 23, 1958, Seybold U.S. Pat. No. 2,705,197 and Marczinczek U.S. Pat. No. 1,574,252 issued Feb. 23, 1926. Artificially produced substances such as fly-ash, which have a similar chemical composition to natural volcanic materials such as vermiculite and perlite, have also been used in such construction materials. See, for example, Kurz U.S. Pat. No. 4,087,285 issued May 2, 1978, and Chemical Abstracts 90: 108,937h, "High Strength Gupsum Products", 90: 757,04Z, "Activation of Fly-Ash For Mortar and Concrete", 87: 121,882u, "Effective Calcium Hydroxide and Gymsum on the Pozzuolanic Properties of Fly-Ash II" and 86: 160,087n, "Calcium Hydroxide and Plaster-Their Effects on Pozzuolanic Properties of Fly-Ash". According to one aspect of the invention, materials such as vermiculite and perlite in expanded form are used in combination with plaster and fibers in a decorative ceiling tile quite different from known gypsum wallboards.

SUMMARY OF THE INVENTION

A decorative tile according to this invention has varying density in the direction of its thickness. The decorative face of this tile, which may have relief elements, recesses, color patterns or the like, has a relatively high density so that it resembles the decorative face of a traditional gypsum plaster tile. The remainder of the tile has a lower density so that the overall weight of the tile is not excessive. Such a tile is readily made by molding.

A molded construction tile according to one embodiment of this invention contains a binder such as plaster, woven or non-woven fiber strands, and a bulk enhancing agent. The bulk enhancing agent according to the invention is a light, typically porous material containing two components which may be similar in chemical composition but are different in form. The first component of the bulk enhancing agent exists in the form of relatively spheroidal, low density particles having irregular surfaces. Expanded perlite can be used as this first component. The second component of the bulk enhancing agent according to this invention comprises granules made of thin flakes such as expanded vermiculite.

This invention can provide a molded construction tile which is easily manipulated and which has, due to its relatively reduced weight and density, increased insulative value and increased fire resistance. Such tiles can be advantageously used in ceiling grid systems.

BRIEF DESCRIPTION OF THE DRAWING

A preferred exemplary embodiment of the present invention will hereinafter be described in conjunction with the appended drawing, wherein like numerals denote like elements, and.

DETAILED DESCRIPTION OF A PREFERRED EXEMPLARY EMBODIMENT

Figure 1:
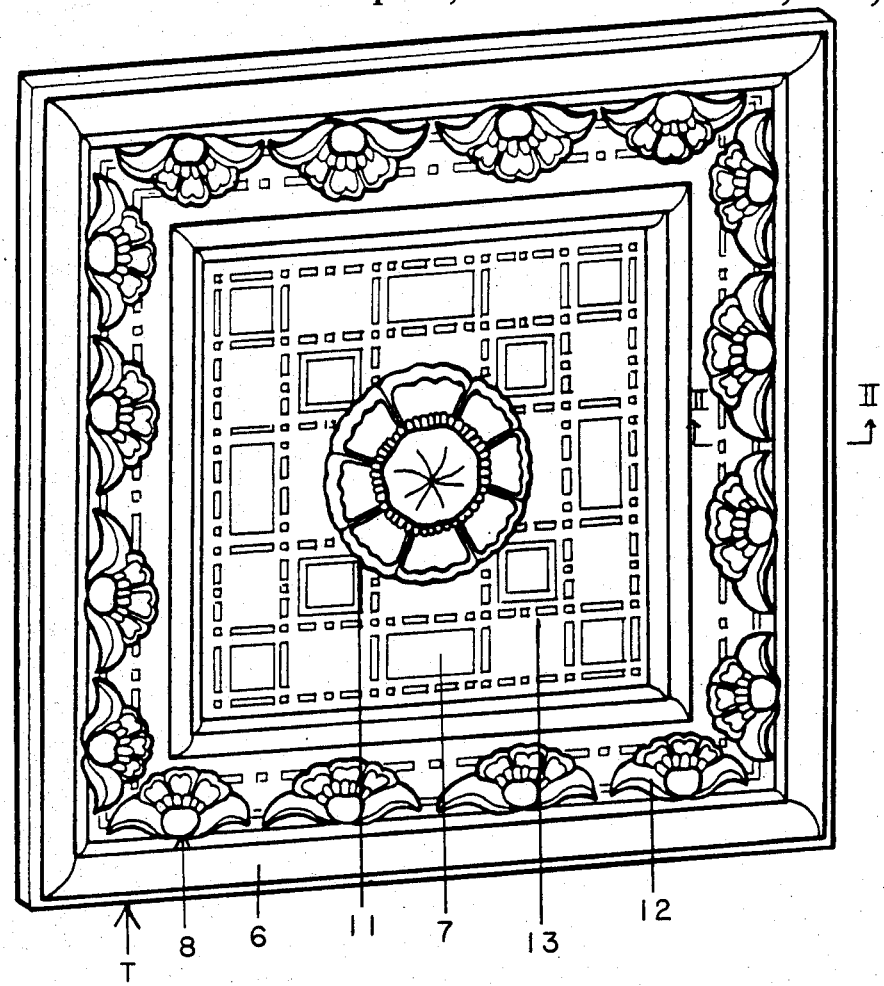
FIG. 1 is a plan view of an ornamental ceiling tile made according to this invention.

FIG. 1 illustrates a tile T made according to this invention having complex ornamentation with several design elements of differing heights. Tile T comprises a square border 6 and a thinner interior panel 7. In this embodiment, panel 7 has a pattern 8 including an intricate raised peripheral pattern 12, a coffered area 13 inward from the periperal pattern 12 and a center medallion 11 surrounded by the coffered area 13. Each of these pattern sections has portions of differing heights or depths from the front surface of panel 7.

According to one aspect of the invention, tile T has a substantially graduated density through its thickness. The front face of tile T is sufficiently dense to retain a sharply defined decorative pattern, e.g. relief ornamentation, and is substantially free from openings or voids, so that the tile has a solid appearance. At the rear face of the tile the density is much lower, and this rear face typically has visible cavities therein formed by air bubbles.

The tile according to this aspect of the invention preferably comprises a pair of layers which form during molding. The tile is generally molded front face down. The heavier components of the tile, such as the binder and to some extent the fiber strands, tend to sink towards the bottom of the mold. The lighter components, such as the bulk enhancing agent and trapped air bubbles, tend to rise towards the upper surface of the mixture in the mold.

Figure 2:
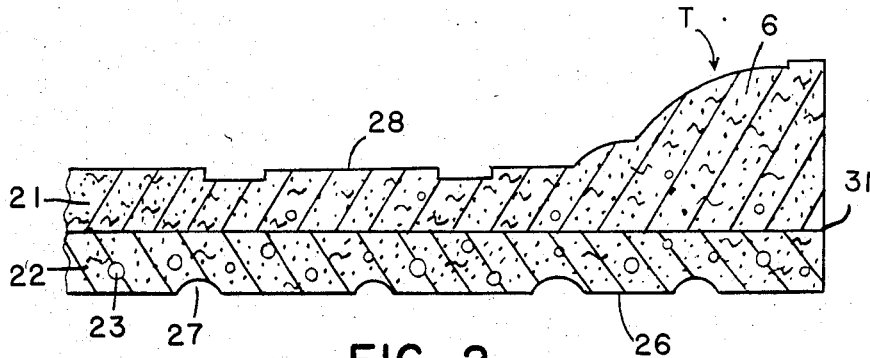
FIG. 2 is a section view along the line II—II in FIG. 1.

Such a tile is shown in FIG. 2. The tile T comprises a front layer 21 and a rear layer 22. Front layer 21 is sufficiently large to include the entire pattern 8. Front layer 21 comprises plaster, fiber strands, and a certain amount of bulk enhancing agent, and is relatively free from voids 23 which result from air bubbles trapped during molding. Rear layer 22 contains plaster, fibers, and a major part of the bulk enhancing agent. In rear layer 22, voids 23 become larger and more numerous towards rear face 26 of tile T. Rear layer 22 thus has a substantially lower average density than front layer 21. Rear face 26 has a relatively poor appearance due to the presence of surface cavities 27 caused by air bubbles which reach the upper surface of the mold mixture during molding. By contrast, front face 28 of tile T is free of cavities 27 and has the appearance of solid stone or plaster.

The foregoing construction has several advantages. The high density of front layer 21 allows front face 28 to have an intricate decorative pattern. The low density of rear layer 22 gives the tile T needed structural strength and thickness without unduly increasing the weight of the tile. For example, a typical tile T according to the invention is about 2 feet square, ½ inch thick on average, and weighs about 6 to 12 pounds, particularly 6–10 or 7–9 pounds. A comparably sized traditional plaster tile made of gypsum plaster and fibers might weigh as much as 25 pounds. Thus, the tile according to the invention is light enough to readily suspend from a grid system but has the appearance of a much heavier, more expensive plaster tile.

Layers 21, 22 naturally tend to blend together at the boundary zone 31 between them, and formation of distinctly visible layers may not always occur. Tile T has a generally graduated density in the direction of its thickness. The density of tile T is greatest at front face 28 and least at rear face 26.

A tile according to the invention for construction of ceiling grids is square, rectangular or otherwise rectilinear and has dimensions of at least about 1×1 feet, especially between 1 and 2 feet square. The average thickness of the tile should be at least about ⅓ inch, particularly in the range of ⅓ inch to 2 inches. These dimensions yield a tile which is light (e.g. 6–12 pounds), easy-to-handle, and appropriately large for bearing classical and modern decorative designs. However, different dimensions could be employed for other specific applications.

In a preferred form of the tile of the invention, border 6 of tile T has a thickness of at least ½ inch, especially ½ to ¾ inch, and a width of at least about ½ inch. Interior panel 7 has a thickness of at least about ¼ inch, especially ¼ to ½ inch, except at relief portions of the decorative pattern such as peripheral pattern 12 and center medallion 11. The thickness of such relief features, including raised and recessed portions, typically varies from ¼ to 2 inches. These dimensions and design features enhance the strength and appearance of the tile. Edges of border 6 support the tile when it is hung, and thus border 6 must have sufficient thickness for supporting the tile. Panel 7 may be made thinner than border 6 to reduce the weight of the tile.

A tile having varying density according to the invention can be molded from a mixture containing a binder, fiber strands, and a bulk enhancing agent. For purposes of this invention, a binder is any substance capable of holding together the fiber strands and bulk enhancing agent of this invention in the form of a rigid decorative tile having sufficient strength to retain its shape when suspended from a grid system as part of a ceiling. Plaster, particularly gypsum plaster, is the preferred binder for this invention. A plaster binder further includes an effective amount of water or comparable liquid to cause setting.

The fiber strands used in the tile according to the invention are any strands capable of enhancing the strength and resistance to sagging or cracking of the tile when distributed in a woven or non-woven form preferably throughout the entire tile. Glass and sisal fibers are preferred. Glass fiber strands for use in the invention generally comprise bundles of individual glass filaments.

The bulk enhancing agent according to the invention, as noted above, contains two components. The first component comprises light, roughly sphereoidal particles having porous, rough surfaces. These particles are sufficiently large so that they resist the tendency to migrate during formation of the tile. Such migration occurs because the light bulk enhancing agent tends to rise to the top of the mixture of binder, fibers, and bulk enhancing agent. Particles of expanded perlite, or a mineral substance having comparable properties, are preferred as the first component of the bulk enhancing agent. Perlite is a form of volcanic glass which expands 4 to 20 times its original volume when heated about 870 degrees centigrade to form porous particles.

The preferred form of the first component according to the invention is a mixture of particles in which most of the particles have properties in the following ranges:

Apparent density 40–170 kg/m$^3$
Wet density 80–320 kg/m$^3$
Particle size 20–200 mesh (0.074–0.8 mm)

Expanded perlite generally has these properties.

The first component of the bulk enhancer according to the invention is preferably made essentially of inorganic oxides, especially oxides of Si, Al, K and Na, wherein silicon oxides account for a major part by weight of the mineral as a whole. For example, perlite consists essentially of about 33 et.% Si, 7 wt.% al, 3 wt.% K, 3 wt.% Na, and less than 1 wt.% each of Fe, Ca and Mg, the balance being oxygen and small amounts of impurities.

The second component of the bulk enhancing agent according to the invention exists in the form of relatively smooth flakes, which may exist in the tile individually or in aggregates. Unlike the sphereoidal, porous particles of the first component, the flakes of the second component tend to slip in the tile mixture as the tile is being formed, i.e. tend to rise in the mixture. Expanded vermiculite is the preferred second component of the bulk enhancing agent. Like perlite, vermiculite is a volcanic mineral made of inorganic oxides, and can be expanded to a low density form by heating.

The second component of the bulk enhancing agent according to the invention preferably comprise a major part of $SiO_2$, MgO and $Al_2O_3$, and a minor part of one or more of other oxides such as $M_2O$, CaO and $TiO_2$. Vermiculite, for example, has an approximate analysis as follows, based on dry weight:

| Oxides | % by wt. |
| --- | --- |
| $SiO_2$ | 38–46 |
| MgO | 16–24 |
| $Al_2O_3$ | 11–16 |

-continued

| Oxides | % by wt. |
| --- | --- |
| Fe$_2$O$_3$ | 8–13 |
| M$_2$O | 4–6 |
| CaO | 1–3 |
| TiO$_2$ | 1–3 |
| MnO$_2$ | 0.1–0.2 |
| Cr$_2$O$_3$ | 0.05–0.2 |
| Na$_2$O | 0.1–0.3 |
| Others including: | 0–0.5 |
| BaO, V$_2$O$_3$ | |
| NiO | |

A synthetic vermiculite substitute having approximately the foregoing composition, if of appropriate form, could be employed in the present invention in place of vermiculite.

The physical characteristics of the second component, e.g. form and density, also influence its usefulness in the present invention. Vermiculite exists in unexpanded form as a relatively dense, flat flake. Upon heating to a suitable temperature, water in these flakes causes them to expand fully or partially to an accordion-like granule in the form of a stack of loosely connected smaller flakes. These expanded vermiculite granules can break apart further to individual flakes and smaller granules.

The second component of the bulk enhancing agent preferably has a bulk density in the range of about 60 to 170 Kg/m$^3$, particularly 80–110 Kg/m$^3$ and a particle size distribution such that at least about 45% of its particles are retained on an 8 Tyler mesh screen (2.3 mm aperture). Preferably at least 90% of the particles remain on an 28 Tyler mesh screen (0.59 mm aperture). The density of the particles affects the strength and weight of the resulting tile. Low density, coarse particles used as the second component may appear on the front face of the tile, detracting from its appearance. High density, fine particles used as the second component may weaken the tile. The particle sizes of the second component granules influence the distribution of the second component in the fluid mixture used to form the tile and in the resulting finished tile.

According to another aspect of the invention, lightweight gypsum plaster ceiling tiles of this invention are formed by adding vermiculite and perlite and optionally mica ore along with glass fibers to form an aggregate. This aggregate, when combined with the gypsum plaster, can provide a construction tile with a bulk density of from 3 to 25 gm/cubic inch. The density in use is determined by the load bearing capacity of the suspension system, the acoustic and thermal insulation ratings required, and the fire rating desired. The tile of this invention can be made as much as eight times thicker per unit weight compared to a glass reinforced gypsum plaster tile without the added bulk enhancing agent of this invention.

Fibers such as glass or sisal fibers are useful in the tile according to this invention. When a tile or panel of gypsum plaster is subjected to bending forces sufficient to crack the tile, the fibers span the crack so that the tile will not fall apart. Such fibers also tend to prevent cold flow (sagging) when the tile absorbs moisture. Fibers such as glass fibers are available in a variety of sizes. The length (chop) of the fibers preferred for this invention is generally a half inch to one inch. While shorter fibers may be used, longer fibers are better at spanning breaks and holding the tile together. Generally, the fibers are used in an amount of two ounces fiber per square foot of glass in a tile averaging about one-half inch thickness. Excessive amounts will decrease the plaster to aggregate ratio which results in reduction of compressive strength of the tile.

Perlite increases the bulk of the tile and the resulting airspaces while decreasing the overall weight. This increase in bulk per unit weight increases the insulating value of the tile. Perlite also serves an important manufacturing function in that it adds green strength. This relates to the strength of the tile during molding before the tile is fully cured and dry. Increased green strength enables the tile to be more easily removed after molding.

The amount of perlite used is coincident with the amount of vermiculite and a ratio of one-to-one by volume is generally preferred, although the relationship of these two components may vary approximately 20% by volume in either direction (08:1 to 1.2:1 vermiculite to perlite). If perlite is present in excess in relation to the amount of vermiculite, the uncured mixture is difficult to work with.

Vermiculite can be used as a component in the aggregate of this invention to perform some of the functions that perlite does. Vermiculite reduces heat transfer and increases bulk. It does not, however, have any influence on green strength except that an excess greater than that ratio set out in the preceding paragraph weakens green strength. The addition of vermiculite does tend to make the formula more fluid and workable during the manufacturing process.

Mica ore is particularly useful for adding fire resistance. ASTM E. 119 is a test for construction materials based upon heat transfer which is given in terms of an hourly rating of transfer of heat through a particular material tested. The presence of mica ore substantially increases the hourly rating and is therefore a generally desirable component in construction situations where extra heat transfer resistance is important. Generally, mica is added at a level between 1 and 3% by weight. Mica as referred to herein is vermiculite in unexpanded form.

The choice of aggregate to plaster ratio is determined by a variety of construction factors such as the apparatus used in manufacturing the tile and the strength desired. While the amount of glass fibers on a per weight basis as discussed above is relatively constant, the other components of the aggregate may be varied depending upon the particular balance between compressive strength resulting from the gypsum plaster and the lessened bulk density obtained by adding the other components of the aggregate.

A preferred embodiment of the tile according to the invention is made by mixing together a plaster and an aggregate, then molding a decorative tile from the resulting mixture. The resulting plaster mixture, excluding the bulk enhancing agent, consists essentially of 30 to 60 wt.% gypsum plaster, 30 to 60 wt.% of water, and 2 to 12 wt.% of chopped glass fiber strands comprising glass filaments. The bulk enhancing agent consists essentially of 25 to 75 volume percent (vol.%) expanded vermiculite and 25 to 75 vol.% expanded perlite. The ratio of plaster to aggregate prior to curing is generally in the range of 1.5–2.5 grams of plaster mixture per cc of bulk enhancing agent. In particular, the following approximate ranges may be used in the preceding embodiment:

| Plaster component: | gypsum plaster | 43–54 wt. % |
| --- | --- | --- |
| | water | 43–54 wt. % |
| | glass fiber strands | 2–12 wt. % |
| Aggregate component: | expanded perlite | 45–55 vol. % |
| | expanded vermiculite | 45–55 vol. % |
| Plaster-aggregate ratio: | 1.75–2.25 gms/cc | |

The plaster component may also contain up to 0.5 wt.% of an agglomerating agent. In a mixture of 45 vol.% vermiculite to 55 vol.% perlite, the ratio of vermiculite to perlite is about 0.8:1.

One formulatiom for use in the manufacture of a ceiling tile is:

gypsum molding plaster 2724 grams
water—2000 cc
methyl cellulose (emulsifier)—5 grams
½ inch glass fibers—277 grams
vermiculite (expanded)—1400 cc
perlite (expanded)—1400 cc In order to obtain a uniform slurry, the incorporation of an emulsifier (agglomerating agent) is desirable. Agglomerating agents are, typically, hydrophilic colloids and are usually polysaccharides which may have been physically or chemically modified. Suitable polysaccharides are modified cellulose, vegetable gums and starch which has been gelatinized or chemically modified. Cellulose ethers such as methyl cellulose are currently preferred. For the formula set forth above, 2000 cc of a 2% methyl cellulose solution provides the desired slurry consistency.

This mixture may be molded by known methods in the same manner as gypsum-based molded plaster panels. Generally the process involves the making of a pattern of the same configuration as the plaster tile. A negative mold is then made from the pattern. A fluidized gypsum-cement mixture is then poured in the mold. A portion of the water combines with the gypsum and the resulting plaster is allowed to cure. After curing, the tile is removed from the mold and may be heated to accelerate drying, preferably below 100 degrees centigrade.

It is helpful to spray the female mold prior to the addition of the slurry with a suitable wetting agent such as benzalkonium chloride. This prevents the formation of bubbles at the surface of the setting tile adjacent the mold.

EXAMPLE

Using proportions of ingredients as described in the foregoing formulation, the decorative molded tile according to the invention can be prepared according to the following procedure. At about room temperature, the water is placed into an open pan. The plaster is added therein and allowed to sit about 3 to 5 minutes so that the plaster slakes (becomes saturated with water). The plaster is then gently mixed with the water to break up clumps and then thoroughly wet the plaster. Vermiculite and perlite particles are then added gradually, either together or alternately. The resulting mixture is stirred with a downward pushing motion to thoroughly mix in the vermiculite and perlite, since vermiculite and perlite tend to float. After all of the vermiculite and perlite have been added, the glass fibers are added and the resulting mixture is stirred until thoroughly mixed, i.e. the mixture has a firm consistency. This mixture is poured into a flexible urethane elastomer mold which is disposed within a rigid wooden mother mold (outer mold). The mold is bounced violently about 10 to 20 times. The mixture is then allowed to set for a period of 15 to 45 minutes. During this period the mixture will reach a creamy state wherein it is desirable to work the back (top) of the mixture in the mold to even out the back face of the tile. After the plaster mixture has set, the tile is removed from the mold and set on a flat surface, such as a slab of marble, for drying.

The bouncing procedure tends to cause air bubbles within the mixture to rise to the surface of the mixture as it lies within the mold. The vermiculite and perlite also tend to rise, so that the resulting tile has a layered structure as described above in connection with FIG. 2.

Air may be whipped into the mixture used to form the tile. This further enhances the graduated density through the thickness of the tile, since the bubbles form permanent voids as the plaster in the tile hardens. The step of shaking the tile mixture during molding causes such bubbles to rise and causes the plaster fluid to sink.

The binder used in the tile, such as gypsum plaster, has a dry density of as much as 1370 Kg/m$^3$. Thus the binder used typically has a density at least about 7 times greater than the average density of the two components of the bulk enhancing agent. A tile according to the invention can thus be made several times lighter than a comparable size tile made only of plaster and fibers.

It will be understood that the above description is of a preferred exemplary embodiments of the invention, and that the invention is not limited to the specific forms shown. Modifications may be made in the composition or structure of the invention without departing from the scope of the invention as expressed in the appended claims.

We claim:

1. A tile comprising a binder having fiber strands and a bulk enhancing agent distributed therein, said tile having a design across a front face thereof and having a density which decreases substantially gradually from front to rear in the direction of the thickness of said tile.

2. The tile of claim 1, wherein said binder is plaster, said fiber strands are chopped glass fiber strands comprising bundles of glass filaments, and said bulk enhancing agent consists essentially of expanded vermiculite and expanded perlite.

3. The tile of claim 1, wherein said tile has an interior panel having a design profile of varying depth formed thereon and a border having a greater average thickness than said interior panel.

4. The tile of claim 1, wherein said tile comprises first and second layers, said first layer including said front face and said second layer including a rear face of said tile opposite said front face, said first layer having a greater average density than said second layer, and said second layer having a plurality of voids distributed therein.

5. The tile of claim 4, wherein said rear face has a plurality of cavities therein, and said front face is substantially free of cavities.

6. The tile of claim 1, wherein said tile has a design profile of varying depth across said front face thereof and said bulk enhancing agent comprises a first component in the form of porous, essentially spheroidal particles and a second component in the form of granules comprising thin flakes.

7. The tile of claim 6, wherein said bulk enhancing agent comprises mineral oxides.

8. The tile of claim 6, wherein said second component of said bulk enhancing agent has a density in the range of 80 to 110 Kg/m$^3$.

9. The tile of claim 8, wherein said first component consists essentially of expanded perlite and said second component consists essentially of expanded vermiculite.

10. The tile of claim 6, wherein said binder comprises gypsum plaster, and said fibers strands comprise chopped glass fiber strands.

11. The tile of claim 6, wherein the ratio by volume of said second component to said first component is in the range 0.8:1 to 1.2:1.

12. The tile of claim 1, wherein said tile is made by a process comprising the steps of forming a mixture containing a plaster component, which plaster component contains said binder and said strands, and said bulk enhancing agent, disposing said mixture in a mold and curing said mixture under conditions effective to form said tile, wherein said plaster component consists essentially of:
30 to 60 wt.% of gypsum plaster;
30 to 60 wt.% of water; and
2 to 12 wt.% of chopped glass fiber strands, each of said strands comprising a plurality of glass filaments; and
said aggregate component consists essentially of:
25 to 75 vol.% of expanded vermiculite; and
25 to 75 vol.% of expanded perlite;
wherein the ratio of said plaster component to said bulk enhancing agent in said mixture prior to curing is in the range of 1.5 grams plaster component per cc of bulk enhancing agent to 2.5 grams plaster component per cc of bulk enhancing agent.

13. The decorative tile of claim 12, wherein said plaster component consists essentially of 43 to 54 wt.% gypsum plaster, 43 to 54 wt.% of water, and 2 to 12 wt.% of chopped glass fiber strands.

14. The decorative tile of claim 12, wherein said plaster component further contains up to 0.5 wt.% of an agglomerating agent.

15. The decorative tile of claim 12, wherein said bulk enhancing agent consists essentially of 45 to 55 vol.% of expanded vermiculite and 45 to 55 vol.% of expanded perlite.

16. The decorative tile of claim 12, wherein said ratio of said plaster component to said bulk enhancing agent prior to curing is in the range of 1.75 grams plaster component per cc of bulk enhancing agent to 2.25 grams plaster component per cc of bulk enhancing agent.

17. A decorative molded tile consisting essentially of gypsum plaster, chopped glass fiber strands, expanded perlite, expanded vermiculite and water, the volume ratio of vermiculite to perlite being in the range of 0.8:1 to 1.2:1, said tile having a front face with a design profile of varying depth and a rear face having bubble-shaped cavities therein opposite said front face, said tile having a substantially graduated density through the thickness thereof, said tile being most dense at said front face and least dense at said rear face.

18. The tile of claim 17, wherein said tile comprises a pair of front and rear layers, said front layer including said design profile and said front face, and said rear layer including said rear face, said front layer being of greater average density than said rear layer.

* * * * *